United States Patent [19]

Chun-Pu

[11] Patent Number: 4,736,144
[45] Date of Patent: Apr. 5, 1988

[54] AUTOMATIC DOOR BEING CONTROLLED WITH A SERVO-CONTROLLED SAFETY PROTECTION DEVICE

[76] Inventor: Hsu Chun-Pu, 1st Fl., No. 6, Alley 2, Lane 421, Kuang-Fu S. Rd., Taipei, Taiwan

[21] Appl. No.: 937,055

[22] Filed: Dec. 2, 1986

[51] Int. Cl.⁴ ............................ H02P 3/18; H02P 5/28
[52] U.S. Cl. ..................................... 318/467; 318/264; 318/283; 318/286; 318/469
[58] Field of Search ............... 318/256, 264, 265, 266, 318/282, 283, 286, 461, 466, 467, 468, 469, 480

[56] References Cited

U.S. PATENT DOCUMENTS

| | | | |
|---|---|---|---|
| 3,891,907 | 6/1975 | Lenakes et al. | 318/124 X |
| 4,006,392 | 2/1977 | Catlett et al. | 318/283 X |
| 4,563,625 | 1/1986 | Kornbrekke et al. | 318/283 X |
| 4,614,902 | 9/1986 | Jessup | 318/282 |

Primary Examiner—Bentsu Ro

[57] ABSTRACT

An automatic door, driven with a motor and a speed sensor, is controlled with a servo device. Upon the door being opened or closed and being stopped by an obstacle or being out of order, the motor to drive the door will be stopped; in case of the door being retarded by a wind force or other factors, the driving power of the motor will automatically be adjusted to such an extent that the door can still be closed together so as to fully use the driving power of the motor.

6 Claims, 8 Drawing Sheets

AUTOMATIC DOOR BEING CONTROLLED WITH A SERVO-CONTROLLED SAFETY PROTECTION DEVICE

BACKGROUND OF THE DISCLOSURE

As a result of the continuous long strides of progress in technology, material civilization and electronic industry, all the high buildings, restaurants, hotels, banks, hospitals, grocery stores, department stores, factories and warehouses have used automatic doors to keep the air-conditioned temperature, to prevent the air therein from convection, to keep the noise from entering into the room, and to facilitate people to pass through the door quickly.

Almost all the conventional doors being used in a building or the like have a common problem, i.e., lacking of repair and maintenance. The normal wear and tear or the damages caused by the sparks (because of the existing conventional automatic doors using electric parts) would cause the doors to have minor troubles, such as the micro-switch that controls the motor does not turn off, or any obstacle is placed on the rail to stop the door to run. Any one of the aforesaid minor troubles would cause the control circuit and the motor not to operate normally. Finally, these minor troubles may damage the motor or the control circuit after a period of running under an overload condition, and a fire may be resulted thereby. The aforesaid examples are known by the inventor due to his experiences in making, installing and repairing the automatic doors for many years. In view of the aforesaid experiences, the inventor has developed an automatic door, which is to be controlled with a servo-controlled safety protection device so as to obviate the aforesaid drawbacks in the conventional automatic doors.

SUMMARY OF THE INVENTION

This invention relates to an automatic door being controlled with a safety protection device so as to raise the efficiency of the motor, particularly to an automatic door which is controlled with a servo-controlled safety protection device. The special features of the device are that it has a speed sensor to rotate synchronously with a motor, but it will generate a corresponding feed-back signal to be transferred into control circuit to compare with a reference signal so as to form a servo-control device. During the door being opened or closed, if the door is unable to move because of an obstacle or trouble, the motor will bear an overload or may be unable to run; and the control circuit will cause a feedback dynamic signal to compare with an overload reference voltage so as to have the door opened automatically and then to cut off the power of motor for protecting the motor. When the door moving at a slow speed and being impacted by a wind force to retard the door movement, the motor power can be regulated automatically to have the door closed steadily so that the power for driving motor can be consumed efficiently.

DETAILED DESCRIPTION

The major object of this invention is to provide a speed sensor in the transmission mechanism of the automatic door device to rotate synchronously with the motor and the generate a corresponding feedback dynamic signal with respect to the rotation speed (rpm) of the motor and the feedback signal is transmitted into a control circuit to compare with a reference signal therein so as to form a complete servo control device. The control circuit can change the driving force of the motor in accordance with the load applied to the automatic door. For example, when the door is subject to a wind force, the driving force of the motor will be increased automatically. When the door being stopped by an obstructive matter, the power supply of the motor will be cut off to enhance the door safety and the door device can be protected under the overload condition, and can be operated to much increase its efficiency.

Figure 1:
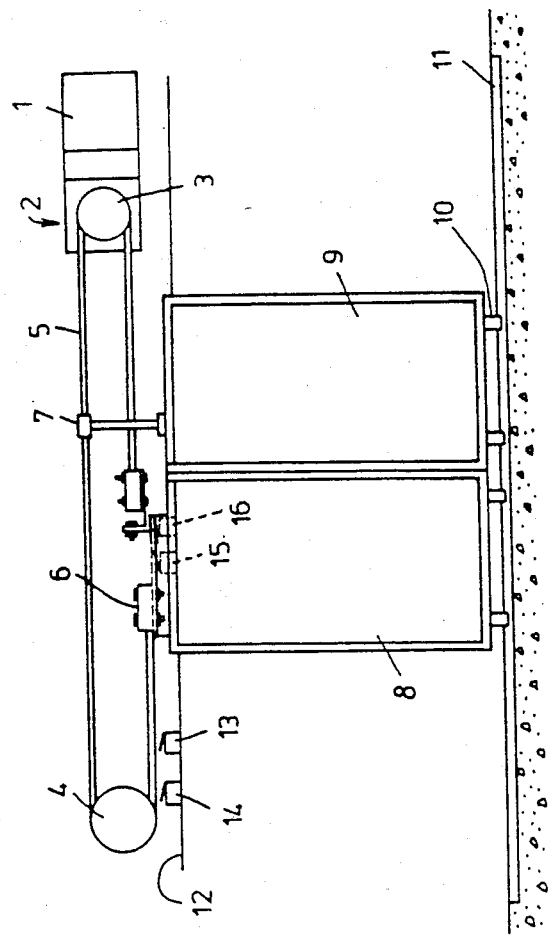
FIG. 1 illustrates a conventional control system of an automatic door.

FIG. 1 illustrates the conventional control structure of an automatic door, in which the motor 1 drives the belt pulley 3 (or steel cable pulley) to rotate through a speed reducer 2. The belt pulley 3 together with an idling belt pulley 4 (or steel cable pulley) drives a belt 5 (or steel cable) clockwise or counterclockwise. Both ends of the belt 5 are mounted, with two hanging members 6 and 7, with two doors 8 and 9 respectively; both doors are furnished with pulleys so as to move along a rail 12. The lower ends of the doors are mounted with guide members 10 so as to move the doors along the rail 11.

The automatic door is normally under closed position. When a person passing through the door, the sensor will actuate the control circuit to allow the motor 1 driving the doors 8 and 9 to open immediately. When the doors almost reaching their fully open position, the door body will touch a low speed switch 13 to reduce the rotating speed of motor 1 so as to lower the moving speed of doors 8 and 9; when the door reaching its fully open position, a stop switch 14 is actuated to stop the motor 1. When a person already passing through the opened door, the sensor would sense nothing, and the control circuit actuates the motor 1 to rotate quickly in opposite direction so as to drive the two doors 8 and 9 moving toward the closed position. When the doors moving almost near the closed position, the door body touches the low speed switch 15 to cause the motor 1 running at a lower speed in order to reduce the moving speed of the two doors. When the doors reaching the completely closed position, a stop switch 16 is actuated to stop the motor 1.

Accordingly, a conventional automatic door has the following disadvantages of drawbacks:

(1) Four micro-switches, such as: low-speed switches and stop switches, are provided for controlling several high-current relays, rectifiers and high-power rheostats for opening and closing a conventional automatic door. The several micro switches should be positioned in a very precise way to thereby increase their installation complexity.

(2) Such micro switches must be electrically connected to several contral relays with high current, to possibly increase their installation inconvenience and cost.

(3) One factor of troubles of the conventional automatic door is susceptible to mechanical wear and fatigue and elasticity because of the four micro switches always having friction with the doors during the opening and closing operation.

(4) Since the aforesaid four micro switches are directly connected with A.C. (Alternating current) power, sparks generated by the instant on/off current become one of its troubles.

(5) Since there is no accurate and quick safety protection device, the motor may be possibly burned out when the micro switches having trouble or when the automatic doors or rails being hindered with an obstacle.

(6) Whenever the weather is changed, the wind pressure applied to the door may increase. That increased wind pressure would influence the complete closing of the doors as subject to normal torsional force of the motor.

Figure 2:
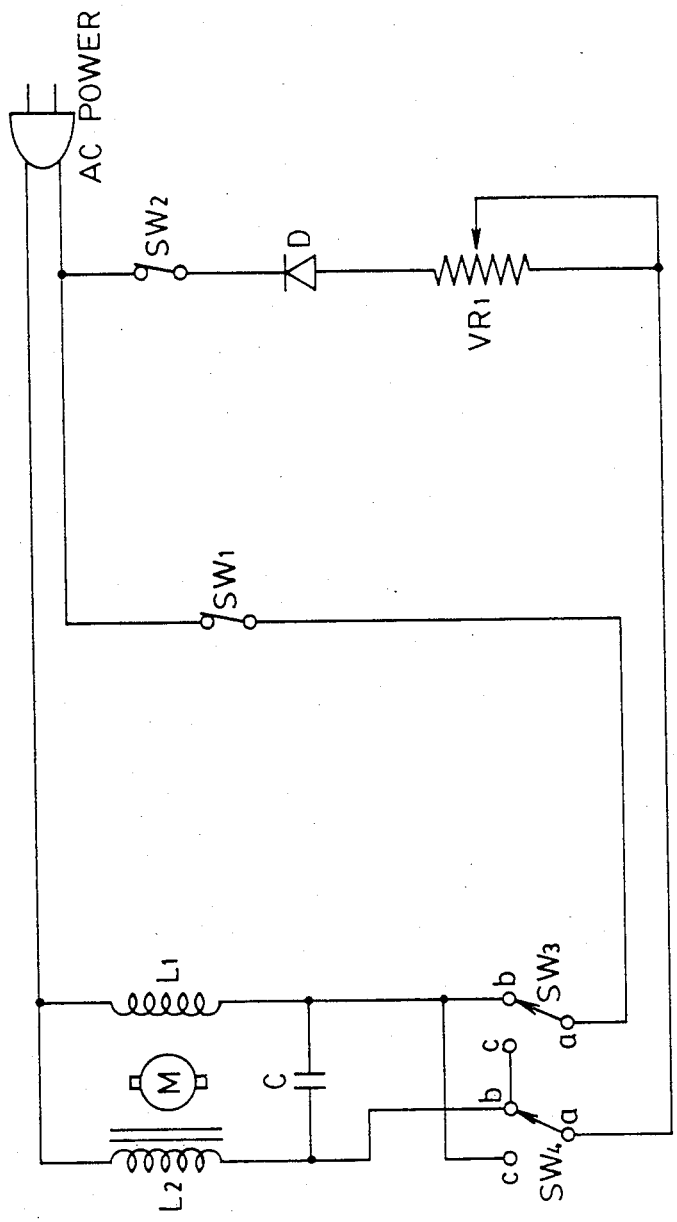
FIG. 2 illustrates a speed-reducing circuit of a conventional automatic door.

(7) In the conventional automatic door, the slow speed and retarding device usually use the circuit and method shown in FIG. 2, in which SW1 is a quick operation switch; SW2 is a slow speed and retarding switch; SW3 and SW4 are the forward/reverse rotation control switches; "D" is a rectifier having large current output; VR1 is a speed regulating rheostat operated with a high power. The aforesaid structure would cause the following drawbacks:

(1) High power will be consumed.

(2) When the reverse coil of the motor is used to offset the reverse lines of magnetic force to reduce the speed, vibration will exert to cause noise pollution.

(3) During the slow speed and retard running, the motor is subject to a high temperature.

(4) Upon two opposite lines of magnetic forces being offset, the windings will generate an instant counter E.M.F. to cause sparks, which may cause damages to the contact points of the switches.

(5) The serviceable life of the motor would be reduced as a result of the factors of (2) and (3) as mentioned above.

Figure 3:
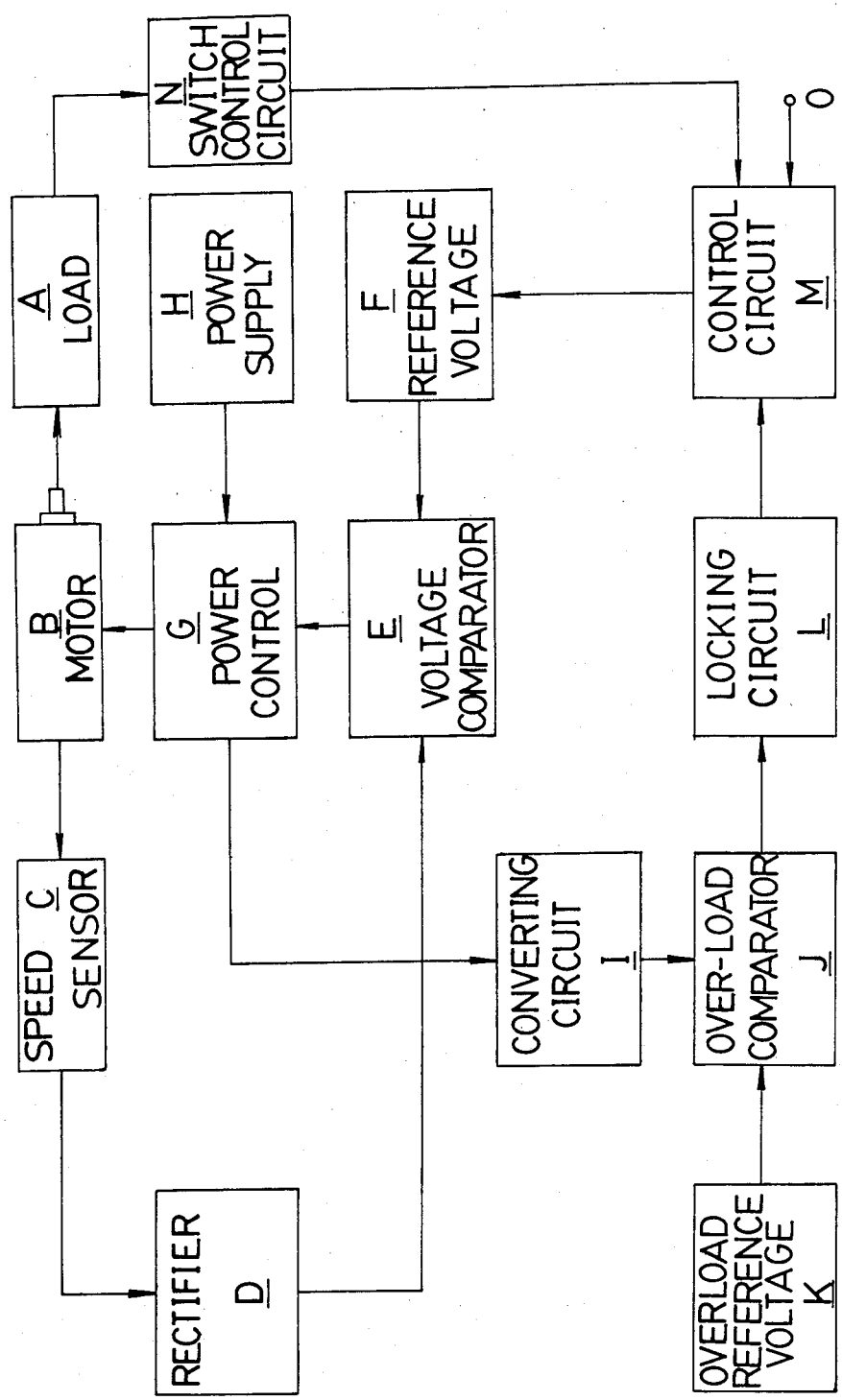
FIG. 3 is a block diagram of the circuit of an automatic door being controlled with a servo-controlled safety protection device according to the present invention.

Briefly, the prime object of the present invention is to provide an improvement to the aforesaid drawbacks by means of a servo control means to obtain an automatic protection device to the door. That device will be described in detail, with reference to the accompanied drawings, as follows:

FIG. 3 is a block diagram of the servo-controlled safety protection mechanism for the automatic door according to the present invention, in which "A" stands for the load of the automatic door (door body), "B" stands for a motor, "C" stands for a speed sensor (RPM inductor), "D" stands for a rectifier, "E" stands for a voltage comparison circuit, "F" stands for a reference voltage setting circuit, "G" stands for power control circuit, "H" stands for a power supply circuit, "I" stands for a converting circuit for instantly varying voltage, "J" stands for an overload voltage comparison and amplification circuit, "K" stands for an overload reference voltage setting circuit, "L" stands for an overload inductive voltage locking circuit, "M" stands for operation condition control circuit, and "N" stands for switch control circuit. The reference voltage setting circuit F determines the rotating speed of the motor, of which the rpm variation is determined by the operation condition control circuit M. The speed sensor C rotates synchronously with the motor B, and then it generates a signal to pass through a rectification circuit to generate a D.C. signal, which indicates its synchronous rotation with the motor B; the D.C. signal is then transmitted into a voltage comparison circuit E so as to compare with the signal voltage from the reference voltage setting circuit F. In that case, the power control circuit G will provide the motor B with a power in accordance with the output signal of the voltage comparison circuit. The speed sensor C can still rotate at a constant speed after sensing a varied rotating speed which is caused by the variation of the automatic door load A and passes through the voltage comparison circuit E. In this invention, the variation signal will pass through the converting circuit I for instantly varying voltage to be converted into a proper varied value which is then fed into the overload voltage comparison and amplification circuit J. In the overload reference voltage setting circuit K, an overload voltage is set, and is fed into the overload voltage comparison and amplification circuit J for comparing the voltage from converting circuit I. In the event of the door being over loaded or being caught without moving, the converting circuit I for instantly varying voltage will generate an inducted signal to indicate the motor being over loaded. The signal will be fed into the overload inductive voltage locking circuit L to generate an output signal to be fed into the operation condition control circuit M to have the automatic door opened so as to prevent the motor from being overloaded. The switch control circuit N is to be controlled by the automatic door load A to generate a signal to be fed into the operation condition control circuit M. The point "O" stands for the input point of the trigger signal.

Figure 4:
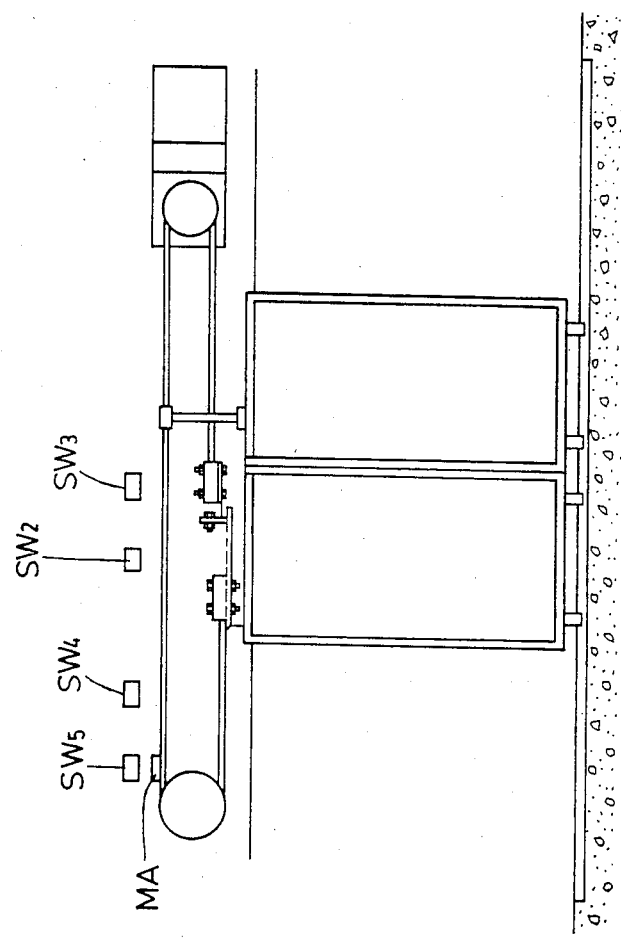
FIG. 4 is an illustration showing an automatic door device according to the present invention.
Figure 5:
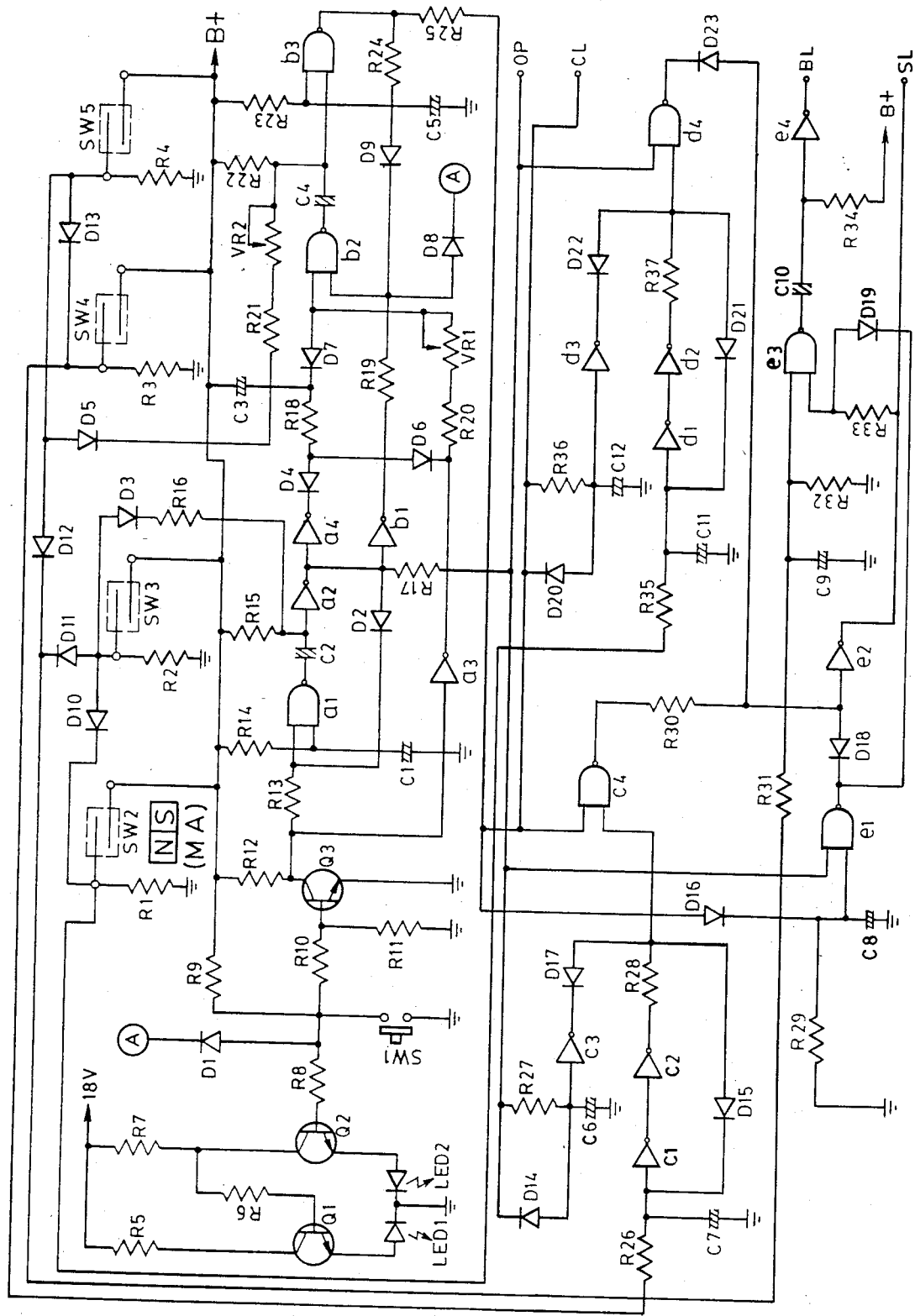
FIG. 5 shows a circuit diagram of a preferred embodiment of the automatic door device according to the present invention.

FIGS. 4 and 5 illustrate the structure and the circuit of an automatic door that is controlled with a servo-controlled safety protection mechanism according to the present invention, in which the switch SW1 is a control switch for opening and closing the automatic door. The reed switch SW2 is a slow speed control switch during the door being opened. The reed switch SW3 is a stop-control switch during the door being fully opened; the reed switch SW4 is a slow speed control switch during the door being closed; the reed switch SW5 is a stop-control switch during the door being fully closed. The reason for using reed switch is to prevent the door bodies from mechanical friction and elasticity fatigue as usually found in a conventional automatic door as utilizing a micro switch which may cause frictional contacting bettween the switch and the door. The door body is controlled with a magnet MA to form an indirectly contact; upon the door being opened, the magnet MA will move together with the belt; upon the magnet touching the reed switch SW2, the speed of the motor will be reduced, and when the magnet touches the reed switch SW3, the motor will be stopped. During closing the door, the magnet MA will move together with the belt in the opposite direction;

when the magnet reaches the reed switch SW4, the speed of the motor will be reduced, and when the magnet reaches the reed switch SW5, the motor will be stopped; in fact, it achieves the purpose of indirect control. The aforesaid control means may be replaced with a photosensitive cell device, and the magnet may be replaced with a shielding means. The reed switch in the switch control circuit may also be replaced with a photosensitive cell. When the belt moving the shielding means, the different positions of the shielding means will provide the photosensitive cell with an indirect control function. The signal generated will be fed into the operation condition control circuit to control the door body to move.

Figure 6:
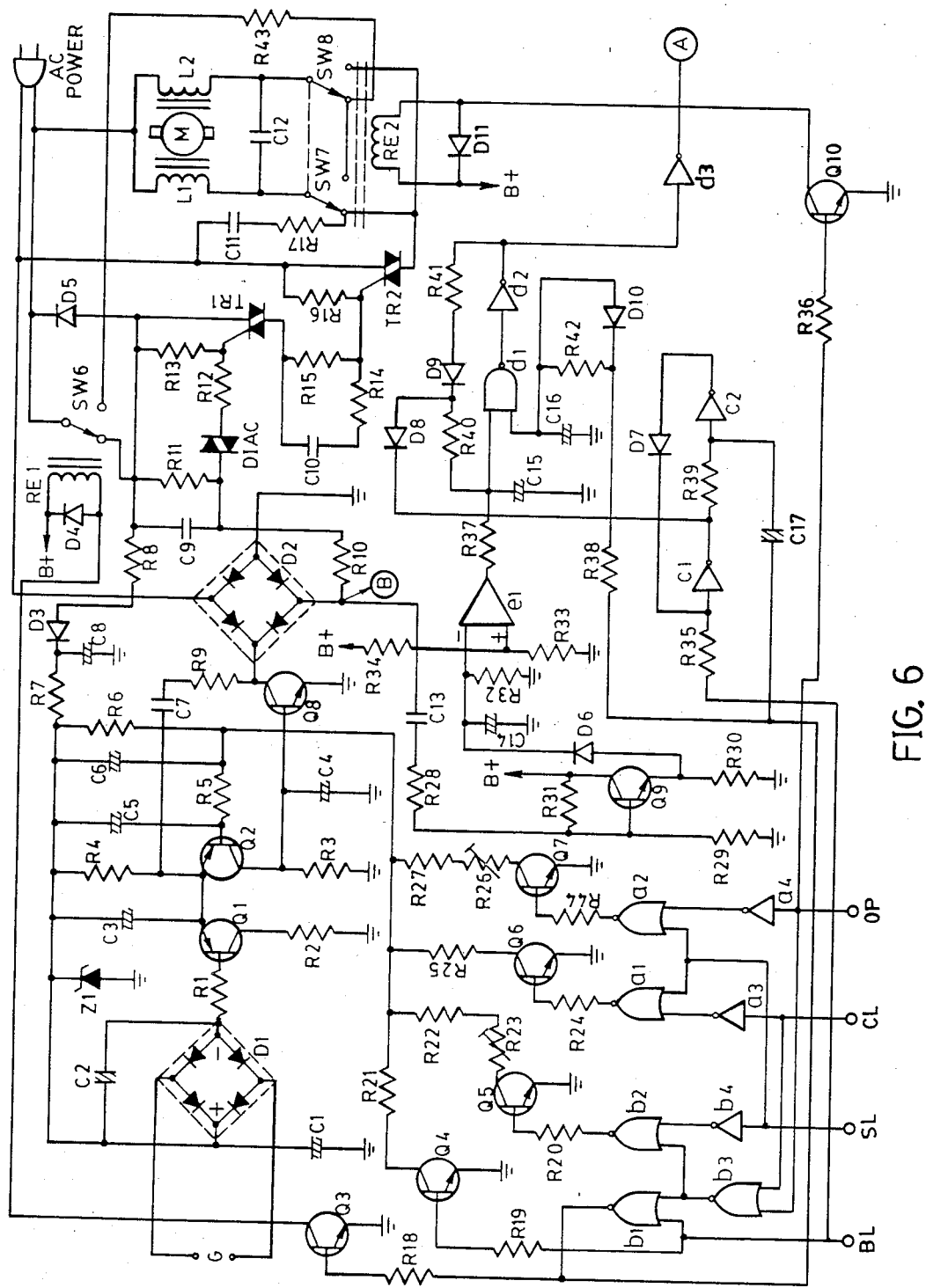
FIG. 6 shows a circuit diagram of another preferred embodiment of the automatic door device according to the present invention.

FIGS. 4, 5 and 6 are the two embodiments of two circuits and structure being used in the automatic door and being controlled with a servo-controlled safety protection mechanism according to the present invention, and the aforesaid circuits are described in detail as follows;

(1) In FIG. 5, SW1 is a switch to be triggered for opening or closing the automatic door. When the switch SW1 is closed, the collector of Q3 is in a high potential condition; the output of IC a1 is in a low potential condition. C2 and R15 together with IC a1, IC a2 and D2 form a monostable multivibrator. Within the RC time constant of R15 and C2, the output of IC a2 is in a high potential condition, which passes through R17 to OP terminal to provide an opening signal to the automatic door so as to open the door.

(2) SW2 is a slow speed reed switch to be used during opening the door. (MA) is in a magnet on the automatic door; when the magnet (MA) reaching the position of SW2, the reed switch SW2 is closed, and the voltage B+ will, through R35, be applied to the input terminal of IC d1. Since a locking circuit comprises IC d1, IC d2 and D21, the output of IC d2 is a high potential to pass through R37 to the input terminal of IC d4. Since the other input terminal of IC d4 is connected with OP, the other input terminal is also in high potential state; therefore, the output terminal of IC d4 will be in a low potential state; then, the output terminal of IC e2 is in a high potential state to be applied to SL as a signal for opening the door slowly.

(3) SW3 is a reed switch for stopping an opening door; when the magnet (MA) together with the door body moving to the position of SW3, the reed switch SW3 will be closed to have the voltage B+ via D3 and R16 applied to the input terminal of IC a2; then, the input terminal of IC a2 may be changed into a high potential state depending upon R16 and R15 being connected in parallel and depending upon the value of R16. If so, the output terminal of IC a2 will be restored in a low potential state to cause OP terminal to be in a low potential state, whereby the automatic door will be stopped; simultaneously, since the input terminal of IC d4 is in a low potential state, the output terminal of IC e2 to SL is also in a low potential state.

(4) As long as SW1 is in closed state, the output terminal of IC a3 is low, which causes capacitor C3 to discharge to low state through R18 and D6, also, one of the input to IC b2 is low through diode D7.

If the external force is removed, SW1 will open and the collect of transistor Q3 changes to a low potential state, consequently, the output of IC a3 becomes high; at the same time, the low potential of C3 will discharge through D7, VR1 and R20 to the output terminal of Ic a3. The RC time constant for the opening and stopping of the automatic door is formed with R20, VR1 and C3, and it can be adjusted with Vr1. After the RC time constant being over, the input terminal of IC b2 turns into a high potential state, and causes the output terminal of IC b3 to generate a high potential state being applied to CL so as to close the automatic door.

(5) A monostable multivibrator is formed with IC b2, IC b3, C4, R22, D9, and R24. As described in (4) above, after the low voltage in C3 being discharged through VR1, R20, and the output terminal of IC a3, the input terminal of IC b2 will be in a high potential state; simultaneously, the input terminal of IC b2 is changed into a low potential state, since it is still within the RC time constant formed with C4 and R22, and the input of IC b3 is also in a low potential state; at the same time, the output terminal of IC b3 is also in a high potential state, which will, through R25, be applied to CL to cause the automatic door to move in the closing direction. Simultaneously, the high potential on CL terminal will, through R36, be applied to the input terminal of IC d3, and then the output terminal of IC d3 is changed into a low potential state, which will, through D22, unlock the slow-speed locking circuit for opening door so that when the automatic door has a high potential on its OP terminal and has SW1 closed again, the output terminal of IC d4 will have a slow speed signal to open the automatic door slowly even within a high-speed operation area.

(6) SW4 is a reed switch for closing the door slowly. (MA) is a magnet mounted on the belt that is driven with a motor for driving the automatic door. When the automatic door body moving in closing direction and reaching the position of SW4, the reeds of SW4 will be closed to lead voltage of B+ through R26 to the input terminal of IC c1. A locking circuit includes IC c1, IC c2, R28 and D15. When the input terminal of IC c4 being in high potential state, the other input terminal of IC c4 is also in a high potential state as a result of CL terminal; then, the output terminal of IC c4 is in a low potential state, which will, via R30, cause the output terminal of IC e2 to be in a high potential state to have the automatic door moved in closing direction slowly.

(7) SW5 is a read switch for the braking and stopping during closing the automatic door. When the magnet (MA) approaching SW5 at a slow speed, the reeds in SW5 will be closed through induction effect before the center part of the magnet moving to the opposite center of SW5 (the distance may be determined by the strength of the magnet MA); simultaneously, the voltage B+ will, through D12 and R31, cause the input terminal of IC e3 to be in a high potential state, while the other input terminal of IC e3 will be in a high potential state via the output terminal of IC e2. The RC time constant formed with C10 and R34 can determine how long the output terminal of IC e4 can maintain a high potential state on BL. The high potential state on BL will cause the motor to change from a slow speed running state to braking and stopping condition. That step will slow down the inertia impact effect of the door body. In that case, the voltage B+ will, via D5, R21 and VR2, be applied to the RC circuit formed with C4 and R22; also, the RC time constant of R21 and VR2 connected in series and then connected with R22 in parallel must be higher than the time constant of C10 and R34 so that the automatic door can still run at a slow speed after being braked and stopped; then, the output terminal of IC b3 is changed into a low potential state after the automatic door being closed to allow the CL terminal being changed into a low potential state so as to further stop the motor of the automatic door.

(8) The aforesaid four reed switches (or photosensitive cells), the several logic gates, the monostable multivibrator and the locking circuit are assembled together to replace the conventional four micro-switches and several power relays so as to improve the operation of automatic door as mentioned previously.

(9) FIG. 6 is a circuit of the safety protection device, which is described in detail as follows:

(10) The base bias of Q2 is provided with a part of circuit including R21, Q4, R22, R23, Q5, R25, Q6, R26, R27, Q7, R6 and R5. The reference voltage required for developing the motor speed is determined by the resistance value of the aforesaid resistors. OP of FIG. 6 is connected with the OP in FIG. 5. When OP being in a high potential state, the output of IC a2 will cause Q7 to become conductive, i.e., the collector and emitter of Q7 is considered in short circuit condition; the value of R26 and R27 will determine the opening speed of the automatic door, while the value of R25 will determine the closing speed of the automatic door; the value of R23 and R22 will determine the slow speed of the door.

(11) "G" stands for a motor rpm inductor being mounted over the shaft of motor to rotate synchronously with the shaft; the signal induced by the inductor will be rectified, through a bridge rectifier D1, into a series of voltage values eS that is varied in proportion to the motor rpm. The voltage eS is coupled to the base of Q1. Since Q1 and Q2 form a differential amplification circuit, if the reference voltage of the base of Q2 is set as eR, the differential voltage generated through Q1 and Q2 will be (eS−eR) A=e0, which is transfered to the base of Q8.

(12) If the voltage on the base of Q8 is e0, the variation of e0 is considered a variable internal resistance between the collector and the emitter of Q8; therefore, when AC power passing through D2, Q8, R10, C9 and R11, the B terminal of the bridge rectifier D2 will show, by testing, a series of varying voltage values because of Q8 being considered as a variable resistance. If the load of motor is increased to cause its rpm to reduce, the variation will be amplified by Q1 and Q2 to obtain a voltage between R3 and the ground being varied in proportion to the rotating speed of motor, i.e., the internal resistance of Q8 being varied in proportion to the rotating speed of motor, and the B terminal of the bridge rectifier D2 will have a variable voltage.

(13) The R34 and R33 on the input terminal (+) of IC e1 can be set with a series of overload reference voltages, i.e., the plus (+) terminal of the voltage comparator. When the automatic door being caught to cause the motor to be unable to move, the variable voltage on terminal B to the ground of the bridge rectifier D2 will immediately be decreased, and will through C13 be coupled to the base of Q9. The resistors R28, R29 and R31 form into a network to reduce the voltage; Q9 is designed as an emitter follower. D6, C14 and R32 form into a rectifier. After the voltage between terminal B and the ground being decreased, it will be converted into a voltage by Q9 and being rectified through D6, C14 and R32, and then be transferred to the input terminal (−) of IC e1, i.e., the minus (−) terminal of the voltage comparator. Whenever the value of e0 on the input terminal (−) is lower than the motor overload reference voltage on the input terminal (+), the output terminal of IC e1 will generate a motor overload signal voltage.

(14) A locking circuit is assembled with IC c1, IC c2, and D7. When the automatic door reaching the braking area, as mentioned in (7) above, D8 will generate a series of low voltages, which are transferred into the locking circuit including IC d1 and IC d2 so as to unlock it. The locking effect is that, upon the two door bodies being almost closed together, the motor is set in an overload condition to prevent it from rotating, and IC e1 will generate an overload signal to be coupled to the input terminal of IC d1. Now that a series of low voltages are generated by D8 and transferred to the locking circuit including IC d1 and IC d2 (note: The value of R40 must be greatly lower than that of R37 so as to prevent the high voltage of IC e1 from being transferred, through R37, to input terminal of IC d1, since R40 is so designed that it would have a current-limiting function only when C15 being discharged through D8.), the original locking effect will be removed. The nonobstructive overload signal due to the closing of the two doors will be automatically removed, thereby unlocking the other logic gates for their next normal operation.

Figure 7:
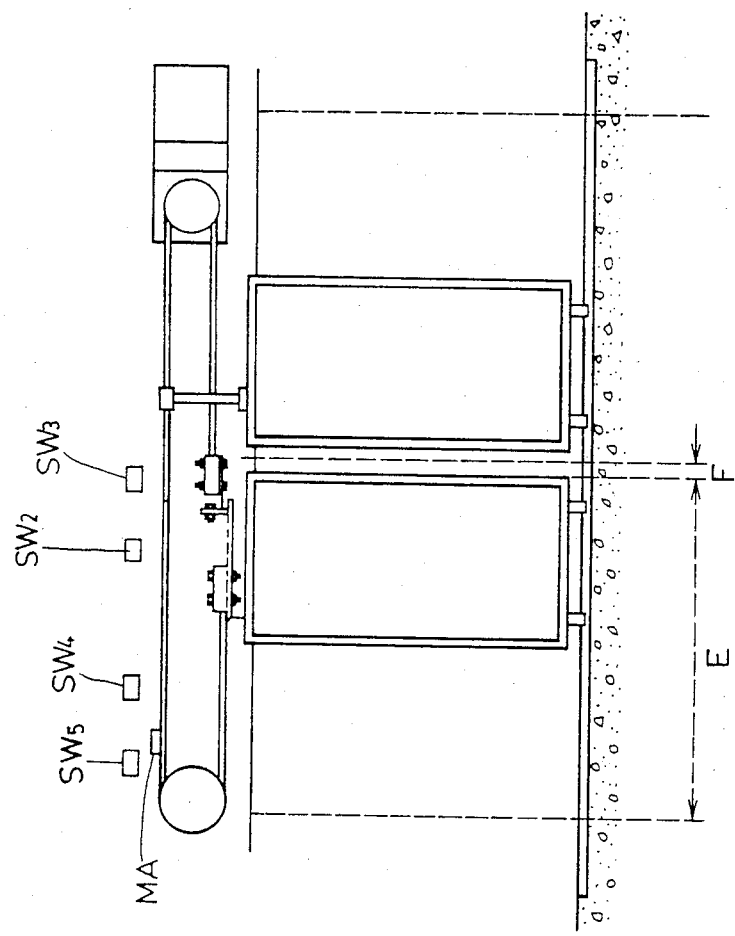
FIG. 7 illustrates the operation of the automatic door device according to the present invention.

When the automatic door being caught with an unknown factor during moving, the doors should be open partially as shown in FIG. 7 so as to prevent the door from being damaged continuously. After the automatic door being first opened, it has to be closed again. When the two door bodies are closed together, it may be assumed that the automatic door is caught; therefore, it is necessary to furnish a means to preclude the catching of an automatic door. The aforesaid catching condition may be referred to as "Dummy Catching Condition F". In principle, the "Dummy Catching Condition F" area should be as minimum as possible. When meeting the aforesaid condition area F, a braking signal referred to as "Dummy Catching Condition F" is generated upon the magnet MA approaching the braking and stopping reed switch SW5.

When the SW5 reaching the vicinity of MA, the automatic door will change its slow speed (SW4 being a slow speed reed switch, and SW5 being a braking and stopping switch) to braking operation, of which the theory has already been mentioned in paragraph (7) as above-mentioned.

If a moving door is stopped with an obstacle in the caught area, the IC e1 shown in FIG. 6 will have a high potential output passing through R37 and transferred into IC d1. A locking circuit (in which the value of R37 must be higher than that of R40 and R41) includes IC d1, IC d2, R41, D9 and R40. Simultaneously, CL terminal (door-closing signal) is in a high potential state, while the signal transferred from IC b3 to IC b1 is in a low potential state. Since the automatic door has not reached the position of the braking and stopping reed switch (SW5), the BL terminal (braking signal) is in a low potential state; then, the two input terminals of IC b1 are in a low potential state, while the output terminal of IC b1 must be in a high potential state, which will pass through R38 and R42 to be coupled to the input terminal of IC d1; in that case, the two input terminals of IC d1 are in a high potential state, and therefore, IC d1 and IC d2 will provide a locking effect (Note: the locking effect can only be furnished when the value of R40 or R41 being lower than that of R37). IC d2 will provide the input terminal of IC d3 with a high potential output; then, the output terminal of IC d3 will have a low potential transferred to terminal A as shown in FIG. 5. Since one of the input terminals of IC b2 is in a low potential state, the signal transferred to CL (door-closing signal) from the output terminal of IC b3 through R25 must be in a low potential state, i.e., to stop the door-closing operation. Simultaneously, a low potential is applied, through terminal A and D1, to the base of Q3 as shown in FIG. 5. In that case, SW1 is deemed as a closed condition, and the collector of Q3 will furnish a high potential to the input terminal of IC a1 so as to have the monostable multivibrator (consisting of IC a1, IC a2, C2 and R15) delivered a high potential from the output terminal of IC a2 through R17 to OP terminal (door-opening signal). In that case, the automatic moves in the opening direction. Simultaneously, a low potential from terminal A will, through D8, be applied to the input terminal of IC b2, and the monostable multivibrator will not operate (since the low potential on terminal A has been locked with IC d1, IC d2, R41, D9 and R40 as shown in FIG. 6) to stop the door operation unless the obstacle has been removed and the main power switch has been turned on again.

When the automatic door entering into the "Dummy Catching Condition Area F", i.e., when the magnet MA approaching SW5, the SW5 will be closed because the magnetic force of MA will cause the terminal BL (braking signal) shown in FIG. 6 as mentioned in paragraph (7) to be in a high potential state; that high potential will, via R35, be coupled to the input terminal of IC c1 to let the locking circuit (consisting of IC c1, IC c2 and D7) to lock the braking signal; then, the output terminal of IC c1 will have a low potential to pass through D8 and R40 to be applied to the input terminal of IC d1, meeting area F of "Dummy Catching Condition". If the automatic door is closed together and being caught, the high potential output of IC e1 would not cause the locking circuit (consisting of IC d1 and IC d2) to lock the output of overload signal from IC e1; in other words, after the automatic door entering into the "Dummy Catching Condition Area", the output terminal A of IC d3 will not be changed into a low potential state.

If the automatic door is not in the braking area, and the motor is caught to cause the output terminal of IC e1 to transfer a signal to the locking circuit of IC d1 and IC d2 (R37 and C15 forming a delay RC circuit to confirm an overload state), the output terminal of IC d3 will have a locking low potential transferred to the three terminals A in FIG. 5 so as to have every logic gate in FIG. 5 stopped to operate. In that case, the terminals of OP, CL, SL and BL will always be in a low potential state, i.e., the base of Q2 shown in FIG. 6 having no reference voltage for the running motor and therefore the automatic door being always in stopped condition so as to prevent the motor from being burned out because of being overloaded continuously.

(15) By means of the aforesaid description, an automatic door can correctly be protected with a servo-control means. The object of that means is to obviate the five drawbacks mentioned above.

(16) When using the safety protection device of the present invention for an automatic door, the following advantages will be rendered to the automatic door.

(17) According to the slow speed-reducing method in the conventional automatic door as shown in FIG. 2, the un-remediable drawbacks of item (6) and (7) will be resulted.

Figure 8:
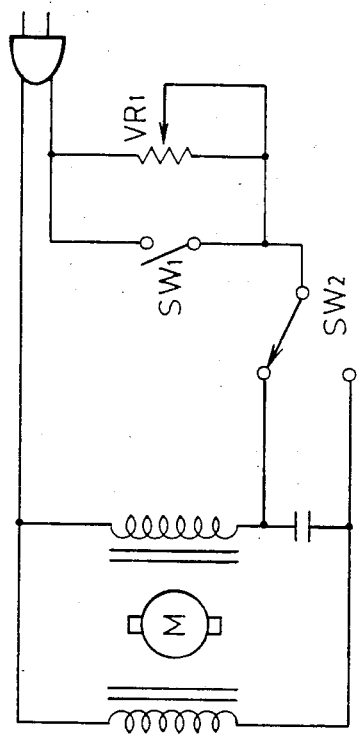
FIG. 8 is a diagram showing the operation of motor at high and low speed in the present invention.
Figure 9:
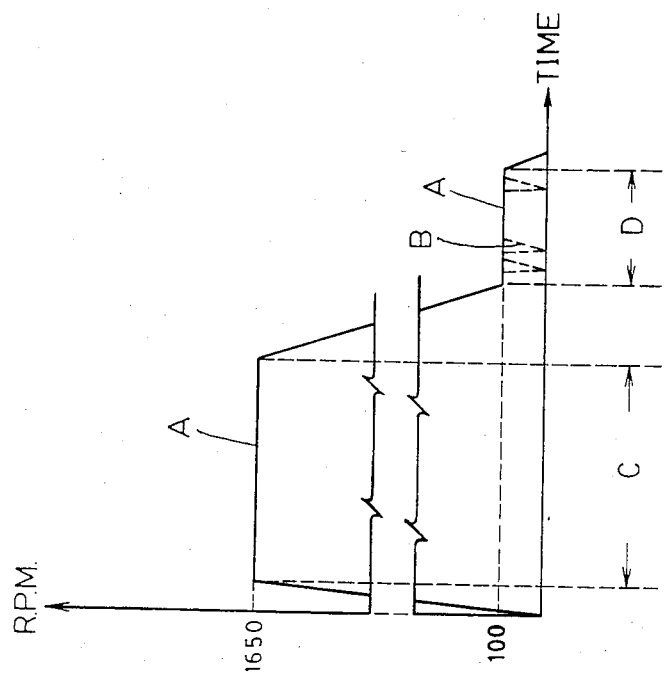
FIG. 9 illustrates the operation curves of the motor at high and low speed.

(18) In order to obviate the drawbacks mentioned in paragraph "(17)", the device as shown in FIG. 8 can be used to substitute that as shown in FIG. 2, to control the motor to run at a low speed to thereby overcome the drawbacks of itsm (7), but rather than the drawback of item (6) because of the following reasons:

(19) Referring to FIGS. 8 and 9, there is shown that if SW1 is turned on, the motor will rotate at full speed; if SW1 is turned off, the rotating of the motor will be determined by the value of VR1, i.e., the slow speed of the automatic door can be varied; however, the load of the automatic door is subject to variation by certain external factors, and therefore a slow speed area B shown with dotted line as shown in FIG. 9 will occur (in FIG. 9, "C" stands for the high speed running area, while "D" stands for the slow speed running area); the aforesaid condition is further described as follows:

In order to have the motor run at a slow speed, a portion of AC power has to be consumed in VR1 (which may be a circuit consisting of SCR or TRIAC) as shown in FIG. 8. If there is no such a means to have VR1 automatically varied with the variation of the door load, the torque of the motor at the slow speed would always be lower than the output torque thereof at the high speed; the slower the speed, the lower the torque. In that case, a door running at a slow speed, rather than at a high speed, would be susceptible to being stopped by a wind pressure or the like to prevent the door from being closed together. If the power for the motor is increased for overcoming the wind pressure or the like applied to the motor at low speed, it may also mean that the motor running at a high speed would cause wasting of power.

(20) In FIG. 6, the terminal B of the bridge rectifier D2 has a variable voltage value, which will vary immediately when the door load being increased as a result of any external factor to reduce the slow running speed of the door; then, the network consisting of C9, R10 and DIAC will trigger TRI, and the triggering angle of TR2 will also be increased; simultaneously, the power applied to the motor will be increased. After the aforesaid steps of increasing the power of the motor, the lowered speed of the automatic door will be recovered to a pre-determined slow speed. The slow speed torque of the automatic door may, if necessary, be raised to the level being equal to that at the high speed so as to run the automatic door steadily. Accordingly to the aforesaid description, it is apparent that not only the automatic door can be protected by the device, but also the power applied to the motor will be consumed effectively. The description in this paragraph can improve the drawbacks mentioned in aforesaid item "(6)".

In the servo-controlled safety device of the present invention, the circuit is an improved one over the conventional circuit.

I claim:

1. An automatic door control system being controlled with servo-controlled safety protection device, comprising:
   an automatic door;
   a motor for opening and closing the automatic door;
   a speed sensor rotating synchronously with said motor to generate a synchronous signal;
   a rectifying circuit for converting the synchronous signal generated by said speed sensor into a DC signal;
   a voltage-comparison circuit for comparing the reference voltage of a reference voltage setting cirucit with said DC signal;
   a motor-power control circuit to be driven by an output signal from said voltage-comparison circuit;

a power supply circuit for providing the device with power;

an instantly varying voltage converting circuit which picks up a varying signal voltage from the power control circuit;

an overload reference voltage setting circuit;

an overload voltage comparison and amplification circuit for comparing said varying signal voltage and the voltage of said overload reference voltage setting circuit;

an overload inductive voltage locking circuit;

an operation condition control circuit for controlling the operation mode of said automatic door; a switch control circuit for sensing the opening, closing and stopping operations of said automatic door; and wherein said motor power control circuit controls the output power of said motor automatically until said DC signal equal to said reference voltage so as to run said motor steadily and increase the efficiency of said motor.

2. An automatic door control system as claimed in claim 1, wherein said switch control circuit comprises four reed switches controlled by a magnet mounted on said automatic door.

3. An automatic door control system as claimed in claim 1, wherein said switch control circuit comprises four photosensitive cells controlled by a shielding means mounted on said automatic door.

4. An automatic door control system as claimed in claim 1, where in said voltage comparison circuit comprises:

a first transistor having its base coupled to said rectifying circuit for receiving said DC signal;

a second transistor having its emitter connected with an emitter of said first transistor and forming a differential amplification circuit with said first transistor, having its base biased by said reference voltage setting circuit which having a plurality of resistors for determining each motor speed based on each reference voltage for said motor, and having its collector connected with a resistor to ground;

a third transistor having its base connected to the collector of said second transistor, having its collector and emitter forming a variable internal resistance therebetween corresponding to a differential voltage as generated through said first and second transistors; and a bridge rectifier electrically connected to said power supply circuit, said third transistor, and said motor-power control circuit, for outputting a series of signals corresponding to different values of said differential voltage.

5. An automatic door control system as claimed in claim 4, wherein said reference voltage setting circuit includes: a door/opening circuit having a transistor and two resistors connected in series with a door opening terminal and having the door-opening speed controlled by at least one of said resistors;

a door closing circuit having a resistor and a transistor connected in series with a door closing terminal for controlling the door-closing speed;

a slow-speed circuit having two resistors and a transistor connected in series with a slow-speed terminal for controlling the slow speed of said door; and a braking/stopping circuit having a resistor and a transistor connected in series with a braking/stopping terminal for stopping said motor.

6. An automatic door control system as claimed in claim 1, wherein said overload voltage comparison and amplification circuit includes: an integrated-circuit comparator having one positive input terminal connected with two resistors for presetting a series of overload reference voltages, having one negative input terminal connected with a rectifier consisting of a diode, a capacitor and a resistor, a transistor formed as an emitter follower, and a voltage-reducing circuit consisting of three resistors, and connected to the output terminal of said bridge rectifier of said voltage comparison circuit, said comparator further having its output connected with a locking circuit normally locking the door operation, whereby when the door is subject to an overload, said comparator will generate a motor overload voltage signal to unlock said locking circuit for further opening said door, and finally cutting off the power to said motor.

* * * * *